Patented Jan. 17, 1939

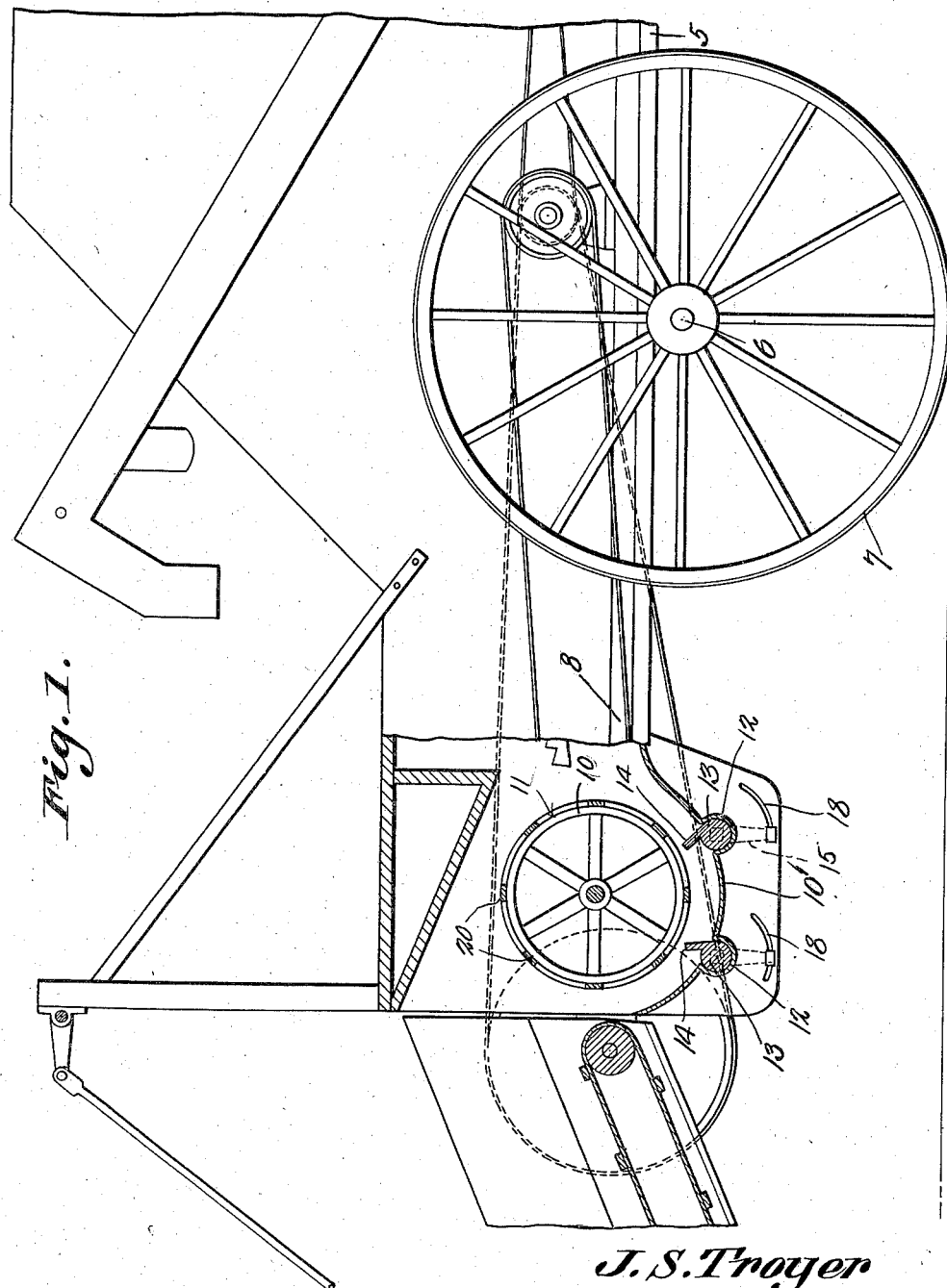

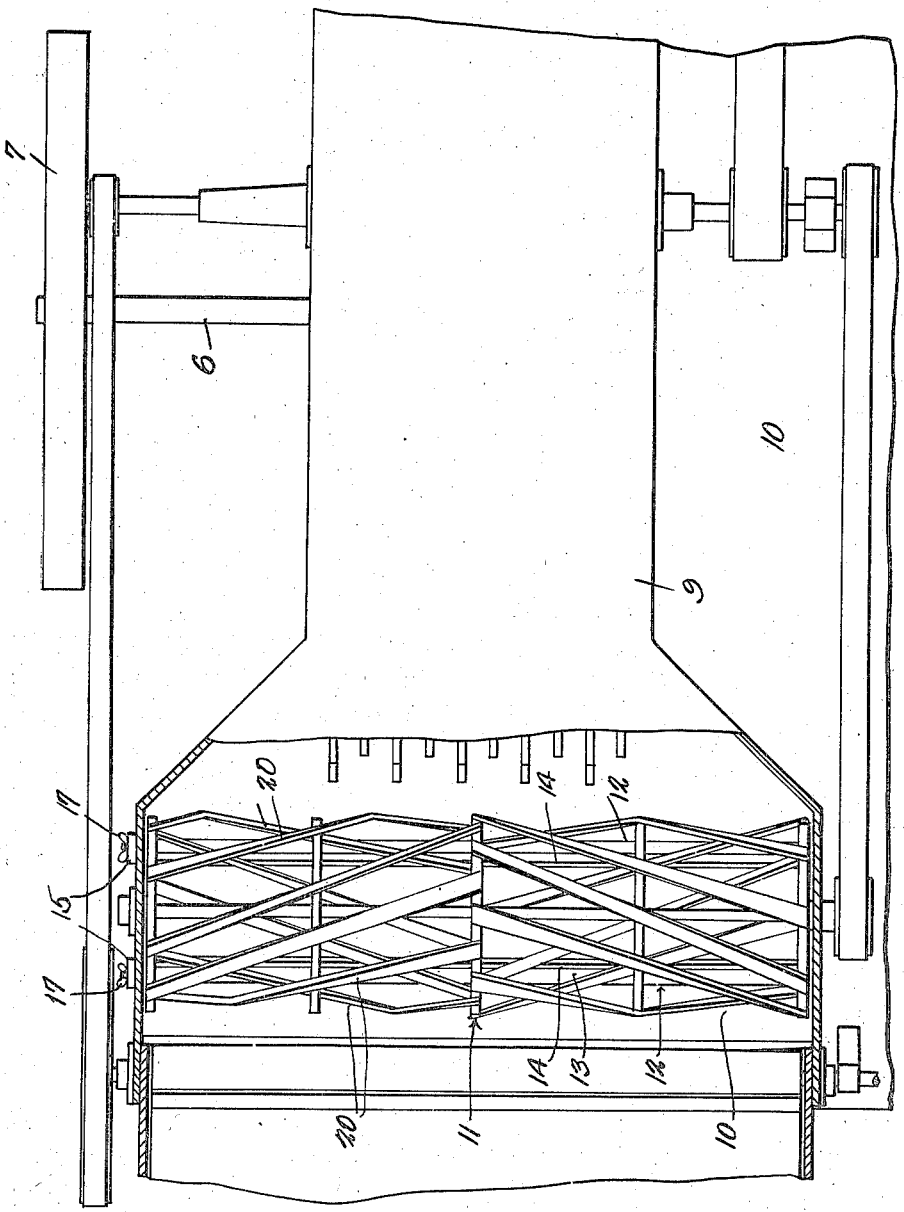

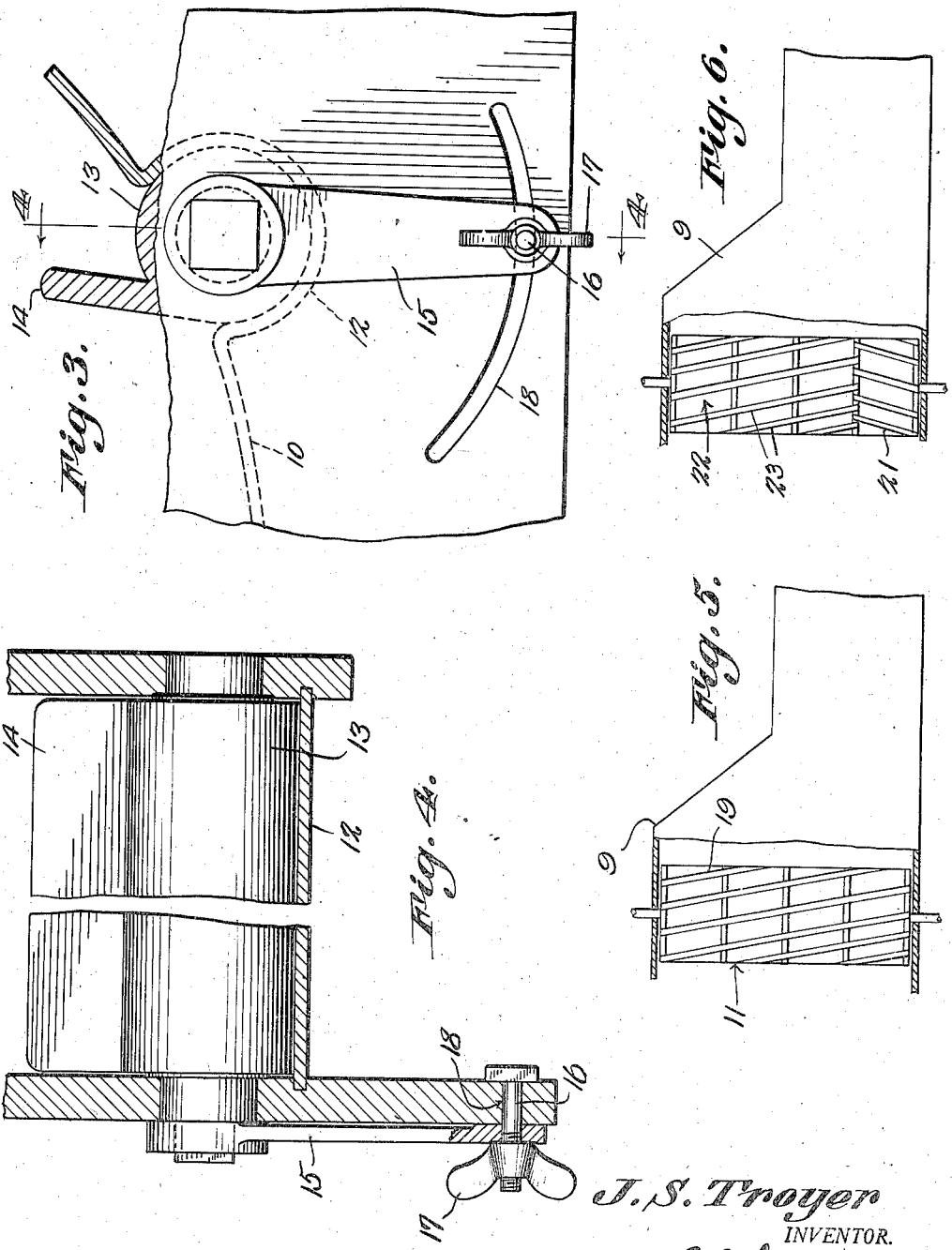

2,144,301

UNITED STATES PATENT OFFICE 2,144,301

HARVESTER-THRESHER

John S. Troyer, Moyock, N. C.

Application September 29, 1937, Serial No. 166,433

2 Claims. (Cl. 130—27)

This invention relates to agricultural machines, and particularly to agricultural machines known as combines.

The primary object of the invention is to provide a machine of this character including a threshing cylinder and adjustable concave bars which may be moved so that the combine may be used effectively in harvesting and threshing various types of grain without damage to the grain.

Another important object of the invention is to provide a threshing cylinder having bars disposed at oblique angles with respect to the ends of the cylinder, with the result that the threshing operation is accomplished by a wiping action of the cylinder thereby eliminating the possibility of the grain or beans being cracked by the action of the cylinder.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a side elevational view of a machine constructed in accordance with the invention.

Figure 2 is a plan view thereof, partly in section.

Figure 3 is a fragmental end elevational view of the cylinder casing, one of the adjustable concave bars being shown in section.

Figure 4 is a sectional view taken on line 4—4 of Figure 3.

Figure 5 is a plan view of a modified form of the threshing cylinder.

Figure 6 is a plan view of a modified form of threshing cylinder.

Referring to the drawings in detail, the reference character 5 indicates the frame of the machine, on which the axle 6 is mounted, the axle accommodating the supporting wheels 7 of the machine.

The reference character 8 designates the platform of the machine which is mounted on the frame, and which provides a support for the body portion 9 in which the threshing cylinder 10 and usual shaker screens of the threshing machine, are mounted.

The front end of the body portion is curved downwardly as at 10' and provides the bottom of the casing in which the threshing cylinder 11 operates.

As clearly shown by Figure 1 of the drawings this downwardly curved portion 10' is formed with transversely disposed grooves 12 which are curved, and provide supports for the concave bars 13 that are provided with longitudinal flanges 14. The ends of these bars 13 are squared to accommodate the arms 15, by means of which the concave bars may be adjusted to cause the free edges of the flanges 14, to lie in proper spaced relation with respect to the threshing cylinder 11, to accomplish the threshing result, and to adapt the device for use in threshing grain or beans. In connection with the threshing operation, it might be stated that when it is desired to use the machine in harvesting and threshing beans, the concave bars 13 may be adjusted so that the flanges thereof will lie flat or substantial flush with the upper surface of the bottom 10 of the casing. With this adjustment of the concave bars a wide space is provided between the bars and threshing cylinder so that the beans may pass therebetween. Bolts indicated by the reference character 16 extend through openings formed in the arms 15, the bolts being provided with winged nuts 17 by means of which the arms may be held in various positions of adjustment. These bolts 16 operate through the arcuate-shaped slots 18 formed in the side of the thresher housing, as clearly shown by Figure 1 of the drawings. The threshing cylinder which is indicated by the reference character 11, plays an important part in the threshing operating, and as shown, embodies bars 19 that are disposed in spiral formation over the periphery of the cylinder, as shown by Figure 5 of the drawings.

In the form of the threshing cylinder as shown by Figure 2 of the drawings, the bars which are indicated by the reference character 20, are also disposed spirally of the surface of the threshing cylinder, the bars at one end of the cylinder being arranged in one direction, while the bars at the opposite end thereof are arranged in the opposite direction. Due to this construction, the straw from which the grain or beans are harvested, will be thrown towards the center of the machine, where it may be conveyed from the machine in the usual way.

As shown by Figure 6 of the drawings, substantially short bars 21 are provided and extend from one end of the threshing cylinder 22, while the bars 23, which are substantially long, extend from the opposite end of the cylinder and have their inner ends disposed between the bars 21 at the opposite end of the cylinder. Thus it will be seen that due to this construction the straw will be carried towards one end of the threshing cylinder.

Due to the construction shown and described, the bars 13 may be adjusted so that the free edges of the flanges 14 thereof will lie in such spaced relation with the threshing cylinder, that the machine may be effectively employed in threshing grain. Should it be desired to thresh beans, the bars 13 may be moved so that the flanges 14 thereof lie in positions adjacent to the curved wall 10 of the casing, providing a greater clearance between the bars and the threshing cylinder, to allow larger material, such as beans, to pass therebetween without danger of crushing or cracking the beans.

I claim:

1. In an agricultural machine, a wheel supported frame, a body portion mounted on the frame, the forward edge of the body portion being curved downwardly and upwardly providing a cylinder casing, a threshing cylinder mounted within the cylinder casing, said cylinder casing having curved transversely disposed grooves formed therein, bars fitted in the grooves, flanges extended longitudinally of the bars and projecting into the cylinder casing, cooperating with the cylinder in threshing grain, and means for adjusting the bars whereby the angle of the flanges is adjusted with respect to the cylinder.

2. In an agricultural machine, a frame, a body portion on the frame, the forward end of the body portion being curved downwardly and upwardly providing a cylinder casing, said cylinder casing having spaced transversely disposed grooves formed therein, bars fitted within the grooves and conforming to the shape of the grooves to rotate therein, flanges formed longitudinally of the bars and extending throughout the lengths thereof, the flanges extending to points in proximity to the cylinder and cooperating with the cylinder in threshing grain, an arm extending from one end of each of the bars, a plate forming one wall of the cylinder casing, said plate having arcuate-shaped slots formed therein, bolts extending from the arms and passing into the slots, winged nuts on the bolts for securing the bolts and arms against movement, said slots permitting of adjustment of the arms to regulate the angular positions of the flanges with respect to the periphery of the cylinder.

JOHN S. TROYER.